United States Patent [19]

Edixhoven

[11] Patent Number: 4,538,330

[45] Date of Patent: Sep. 3, 1985

[54] VENETIAN BLIND ASSEMBLY APPARATUS

[75] Inventor: Gerardus H. Edixhoven, Voorschoten, Netherlands

[73] Assignee: Hunter Douglas International N.V., Curacao, Netherlands Antilles

[21] Appl. No.: 504,975

[22] Filed: Jun. 16, 1983

[30] Foreign Application Priority Data

Jul. 16, 1982 [GB] United Kingdom ................ 8220688

[51] Int. Cl.³ ........................ B23P 19/04; B65H 5/08

[52] U.S. Cl. ........................................ 29/24.5; 271/11

[58] Field of Search ......................... 29/24.5; 414/121; 271/11, 12, 13, 107

[56] References Cited

U.S. PATENT DOCUMENTS

| | | | |
|---|---|---|---|
| 2,769,223 | 11/1956 | Rosenbaum . | |
| 3,140,867 | 7/1964 | Cole | 271/107 |
| 3,291,482 | 12/1966 | Stemmler | 271/11 |
| 3,715,118 | 2/1973 | Larson | 271/11 |
| 3,907,278 | 9/1975 | Jaton | 271/11 |
| 4,002,332 | 1/1977 | Hoenigsmann | 271/11 |
| 4,129,294 | 12/1978 | Marass | 271/107 |
| 4,189,136 | 2/1980 | Robinette | 414/121 |
| 4,262,896 | 4/1981 | Uchida et al. | 271/107 |

*Primary Examiner*—Howard N. Goldberg

*Assistant Examiner*—Steven Nichols

*Attorney, Agent, or Firm*—Pennie & Edmonds

[57] ABSTRACT

Precut and punched fully formed slats for a venetian blind are mounted upside down in a stack on a slat magazine cradle disposed below the assembly station of a venetian blind assembly apparatus, and are picked up, one at a time, by a suction cup and fed in between two endless feed belts which pass around a roller so that the slats are fed the correct way up into the assembly station.

6 Claims, 8 Drawing Figures

VENETIAN BLIND ASSEMBLY APPARATUS

DESCRIPTION

The present invention relates to a venetian blind assembly apprataus having a slat feeding device for assembling slats and ladder cords to form a venetian blind.

U.S. Pat. No. 4,073,044 discloses a machine for the production of venetian blind slats and for assembling them in relation to the ladder cords therefor. This machine includes a production unit by which slats are formed from reeled stock, and a slat/ladder cord assembly station into which the formed slats are fed, one at a time, for endwise advancement through the ladder cords. This is followed by the stacking of the slats together with the ladder cords in an assembled venetian blind array.

The machines disclosed in this Patent have proved themselves to be effective in use, except that they have not catered for the acceptance of a supply of slats which have been previously formed at a site other than that by which the slat/ladder cord assembly takes place.

This does not amount to a deficiency in the prior machine, but it can be an economic shortcoming, since there are many more or less localized sites where the scale of venetian blind production warrants slat/ladder cord assembly using an assembly station of the type described, but using fully formed slats, which are produced separately on a large scale at a more centralized site and it may be limited, if desired, to the production of the thus formed slats alone.

According to the present invention, there is provided apparatus for assembling slats in the ladder cords of venetian blinds with the apparatus having a slat feeding device for individually feeding slats to an infeed end of a slat ladder cord assembly unit and a machine base for supporting the feeding device and assembly unit. The feeding device comprises a headstock upstanding from one end of the base, a slat magazine cradle disposed longitudinally of and mounted on said base below the assembly unit and capable of holding a stack of fully formed slats having leading ends disposed adjacent the headstock, means mounted adjacent the headstock for picking up slats near their leading ends one at a time from the stack and then presenting the leading ends sequentially to the headstock and means within the headstock for redirecting and propelling slats presented thereto to the infeed end such that the slats are inverted as they travel from the cradle to the infeed end.

Such an apparatus can be very compact and simple, but effective in feeding in the fully formed slats, one at a time from a stack thereof into the infeed end of the assembly station.

The complete machine, with the slat feeding apparatus mounted thereon, would only take up slightly more space than the assembly machine alone.

In a preferred construction, the means on the cradle for picking up the slats comprises:

a stop block on that end of the cradle nearer to the headstock against which the leading end edges of the slats ride;

a slat elevator block swing-mounted on said stop block by parallel link means;

a suction cup on said slat elevator block; and drive means on the cradle to translate arcuately said slat-elevator block thereby to lift the leading end of a slat from said cradle and present the leading end to said headstock.

Advantageously, in order to release the individual slats, means are provided to break the vacuum in the suction cup. These means may comprise a valve within the suction cup and a passage closed by the valve, the passage communicating with the exterior and means to lower the valve stem so that air can enter the suction cup via the valve guide.

Preferably the means within the headstock comprise a pair of endless belts having working flights able to receive a slat therebetween and to direct it into the assembly station. If the cradle is mounted below the assembly station then slats may pass around a roller so that the slats can be the right way up. By having the slats mounted upside down in the cradle, this has the advantage that when the suction cup picks up a slat it will be acting on the concave side of the slat and will tend to flatten the slat at the point of contact of the suction cup. It will be realized when several slats are stacked on top of one another, because of their concave/convex shape, there will be a tendency for the slats to stick together by the suction effect. The flattening produced by the suction cup will tend to break this suction effect and will assist in allowing the slats to separate from one another. Thus any second slat which tends to be picked up by the suction cup will be released and will drop back onto the stack.

Advantageously, the stop block has a camming face which confronts the leading end edges of the slats in the cradle and this is stepped to relieve contact between the leading end edges as they travel from the cradle to the headstock.

Preferably the cradle is swing-mounted on the base and the drive means comprise a linear motor.

In order that the present invention may more readily be understood, the following description is given, merely by way of example, reference being made to the accompanying drawings in which.

Figure 1:
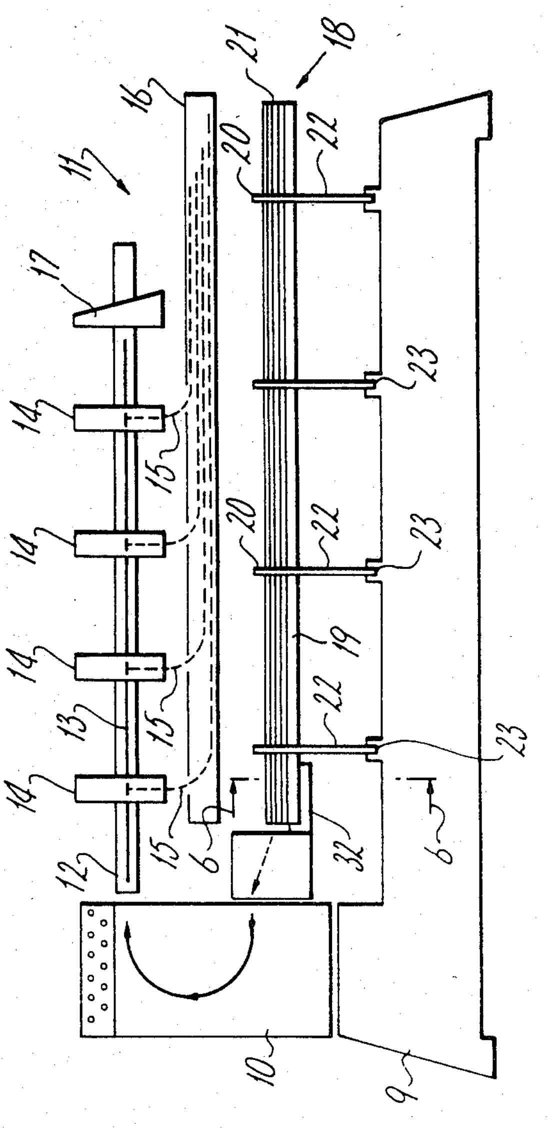
FIG. 1 is a diagrammatic side elevation of one embodiment of venetian blind assembly machine, including a slat feeding apparatus according to the present invention.
Figure 2:
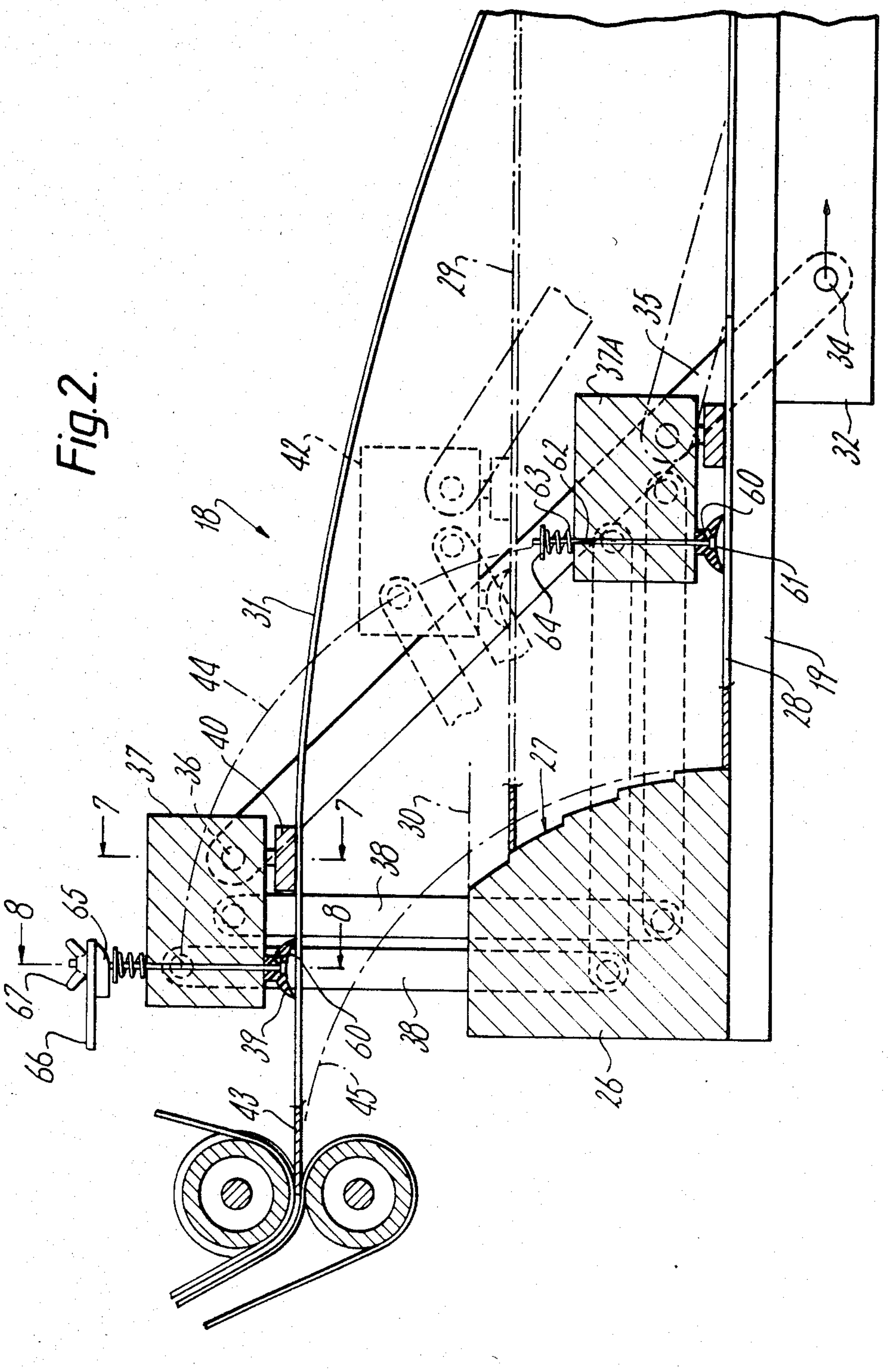
FIG. 2 is a side elevation, on an enlarged scale, of the slat pick-up mechanism indicated but not shown in detail in FIG. 1.
Figure 3:
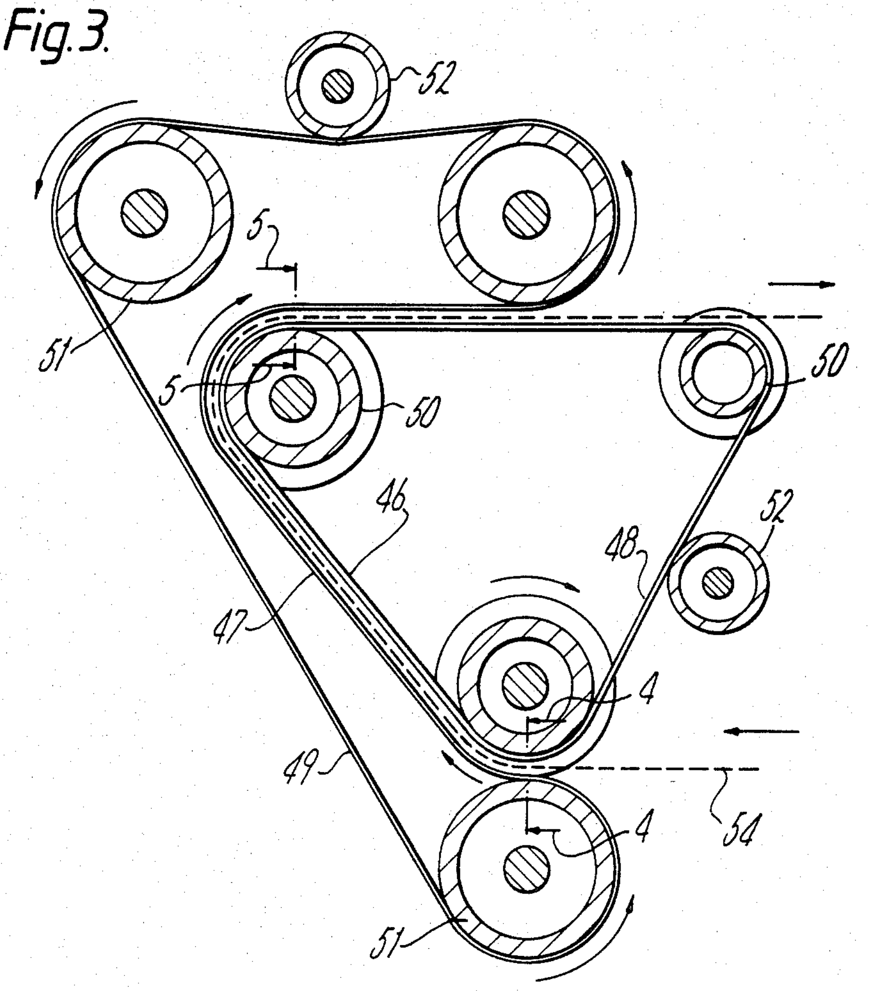
FIG. 3 is a side elevation of the slat feed means.
Figure 4:
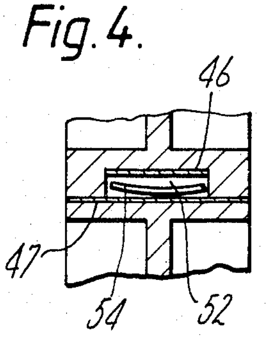
Figure 5:
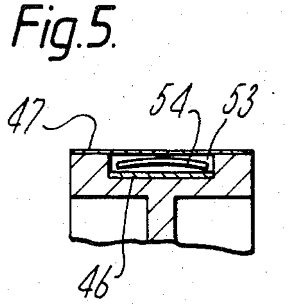
Figure 6:
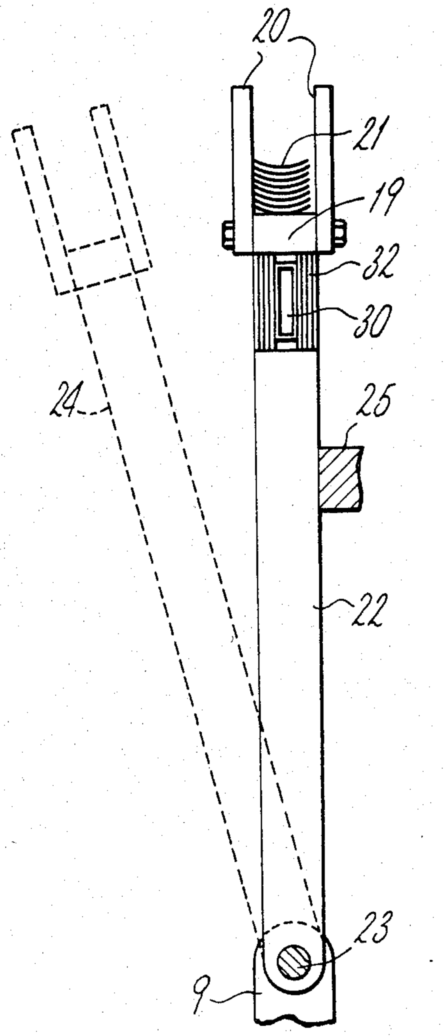
Figure 7:
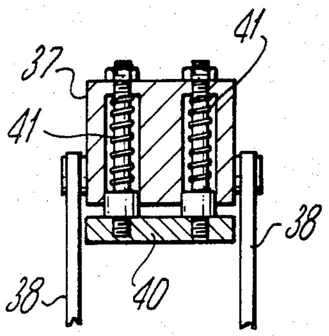
Figure 8:
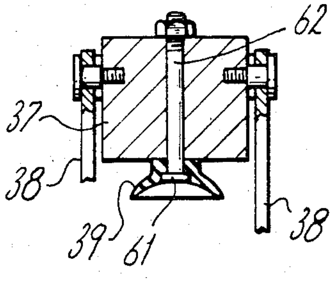

FIGS. 4 and 5 are fragmentary sections, respectively, taken along lines 4—4 and 5—5 in FIG. 3;

FIG. 6 is a sectional end elevation taken along the line 6—6 in FIG. 1; and FIGS. 7 and 8 are detailed sections respectively taken along the lines 7—7 and 8—8 in FIG. 2.

Referring first to FIG. 1 of the drawings, a machine base 9 has a headstock 10 upstanding at one end. This headstock has a slat-ladder cord assembly station 11 extending from it in cantilever fashion to overlie the base 9.

Station 11 is substantially of known kind (as indicated) in that it is adapted to receive longitudinally disposed slats by way of its infeed end 12. The arriving slats take up a stacking position as indicated at 13 and in so doing they extend through a selected number of work stations 14 where they are threaded through and engage with the ladder cords 15 drawn up from a ladder cord magazine 16. Station 11 may include the usual control means such as an adjustable photoelectric stop 17 which, by engagement with the arriving ladder cord, initiates the next slat infeed cycle.

A slat magazine cradle 18 mounted below the assembly station 11 includes a spinal bar 19 carrying pairs of upstanding fingers 20 to form a channel-like receiver for a stack of fully formed slats 21. The bar 19 could be stationary but is preferably mounted on a plurality of radius rods 22, hinged on the base 9 at 23, so that the cradle may be swung away from the position which is shown in full lines in FIG. 6 to a second position shown in dotted lines in FIG. 4 for assisting in the charging of the cradle with a fresh supply of slats. The cradle may be located and held in its work position by a magnetic catch 25 or otherwise.

The spinal bar 19, at its end adjacent the headstock 10, carries a stop block 26 having a camming surface 27 against which the leading ends of the slats supplied to the cradle 18 may be abutted. Referring particularly to FIG. 2, a bottom of the stack slat 28 is shown abutted against the face 27. Another slat 29 which is shown in the course of being lifted from the cradle is similarly abutted against the face 27. In this Figure there is also shown a line 30 indicating the maximum stack height which is possible, and at 31 a further slat is shown, raised from the stack and in the course of being presented to the headstock.

The spinal bar 19 also carries a linear motor 32 having its armature 33 coupled at 34 with one end of a draglink 35 of which the other end is pivoted at 36 to a slat elevator block 37.

By way of parallel links 38 the block 37 is swing-mounted on the block 26, so as to ensure that, during translation of the block 37 between its top position and its bottom position indicated at 37A, the block remains similarly oriented relative to the horizontal. The block 37 carries a suction cup 39 and a stripper block 40 which is springloaded as shown at 41.

FIG. 2 shows the suction cup 39 which is provided with a passage 60 which can be closed by a valve 61 carried at the lower end of a valve stem 62 which is surrounded, at the top, by a compression spring 63 engaged on a disc 64, so that the valve 61 is urged upwardly to close the passage 60.

In the upper position 37 of the block, the upper end of the valve stem 62 can be engaged by a pusher 65 mounted on an arm 66 by means of a screw and wingnut 67. The pusher 65 can thus disengage the upper surface of the cam 61 on the interior of the suction cup so that the vacuum is released via the passage 60.

When a slat is to be picked up from the top of the stack in the cradle 18, linear motor 32 is operated to lower block 37 into a position such as that shown in 37A or that indicated by dotted lines 42 as the height of the stack permits. In doing this, block 40 cushions the impact with which the cup 39 takes a hold on the top slat. Reverse operation of the motor 32 in the direction of the arrow in FIG. 2 lifts the slat towards the top position, as shown by slat 31 where the leading end 43 of the elevated slat is positioned for seizure and propulsion to the assembly station 11.

It will be seen that in effecting its translational movement, the block 37 travels along an arc 44, and therefore the leading end of the slat which is rising, for example, from the position of slat 28, will follow a locus 45 of the same radius so that it is desirable for the camming face 27 to be inside the locus 45 (as shown), so that the raised slats are less likely to fall short of the top position they are to occupy in order to be seized as will be described later. In this connection, it will be appreciated that the slats are relatively flexible and, therefore, when one is lifted in the manner shown by the slat 31, it bends, and so its trailing end continues to bear on the top of the stack. This causes the lifted slat, as it is drawn away from the cradle, to exercise a frictional drag on the next slat on the top of the stack, thus causing its leading end to be brought into firm abutment with the face 27. Experience has shown that the firmness of this abutment may be such that the frictional loading which face 27 imposes on the leading end of the rising slat, may cause the cup 39 to relinquish its hold on the slat prematurely. For this reason it is desirable for the face 27 to be stepped, as shown, so that any such firm abutment will be of limited duration.

As the leading end of the slat approaches its topmost position, as shown by slat 31 in FIG. 1, it is presented to, and seized between, the working flights 46 and 47 of two endless belts 48 and 49 (FIG. 3). These belts run on conventionally powered rollers 50 and 51 which are carried on the headstock 10 and are tensioned by jockey pulleys 52. The belt 48 preferably runs in pulley grooves 53, so that the through going slats 54 are not overstressed by excessive lateral flattening during transit.

It will be appreciated that as the slats travel from their position of entry between the belts 48 and 49, to the position in which they enter the infeed zone of the assembly machine, their orientation is reversed. In the assembly machine it is normal for the slats to be the correct way up, that is to say with their concave surface facing downwardly. This means that the slats should be stacked with their concave surface facing upwardly in the cradle. This has a further advantage. Because the slats are all concave-convex, and are nested in one another in the stack on the cradle, there is a tendency for them to stick together by the vacuum effect. Because the suction cups pick up the topmost slat on the concave side there is a tendency for this concavity to be flattened. This has the effect of releasing the vacuum between the slat and its adjacent slat therebelow, thus facilitating the feeding of the slats from the stack.

It will be appreciated that when the slat is raised to its upper position 31 as illustrated in FIG. 2, the pusher 65 will push the valve stem 62 downwardly thus breaking the vacuum in the suction cup and releasing the slat.

Upon leaving the array of rollers 50, 51, the leading ends of the slats are presented directly to the assembly station 11 for it to deal with them in the usual way.

I claim:

1. A venetian blind assembly apparatus for assembling a supply of fully formed blind slats to at least two ladder cords by individually introducing said slats between adjacent cross rungs of said ladder cords where said apparatus has a slat feeding device for individually feeding slats to an infeed end of a slat ladder cord assembly unit and a machine base supporting said feeding device and assembly unit; said feeding device comprising:
   (a) a headstock upstanding from one end of said base;
   (b) a slat magazine cradle disposed longitudinally of and mounted on said base below said assembly unit and capable of holding a stack of fully formed slats having leading ends disposed adjacent said headstock;
   (c) means mounted adjacent said headstock for individually picking up slats near their leading ends from said stack and presenting the leading ends sequentially to said headstock; and, (d) means within said headstock for redirecting and propelling slats presented thereto to the infeed end whereby said slats are inverted as they travel from said cradle to said infeed end.

2. Apparatus according to claim 1 wherein the means for picking up slats comprises:

(a) a stop block adjacent an end of the cradle nearer to said headstock and against which the leading end edges of the slats abut;

(b) a slat elevator block swing mounted with respect to said stop block by parallel link means;

(c) a suction cup on said slat elevator block; and (d) drive means to translate said slat elevator bloc arcuately thereby to lift the leading end of a slat from said cradle and present the leading end to said headstock.

3. Apparatus according to claim 2, wherein means are provided to break the vacuum in said suction cup.

4. Apparatus according to claim 2 or 3, wherein said stop block has a cam face which confronts the leading end edges of slats in said cradle and which is stepped to relieve contact between the leading end edges as they travel from said cradle to said headstock.

5. Apparatus according to claim 2, 3 or 4, wherein said cradle is swing mounted on said base.

6. Apparatus according to any preceding claim, wherein said means within said headstock comprise a pair of endless belts having working flights able to receive a slat therebetween and redirect it into said assembly station.

* * * * *